Dec. 13, 1927.  
J. B. FISHER  
1,652,432  
UNITARY POWER STRUCTURE  
Filed March 10, 1926  
2 Sheets-Sheet 1
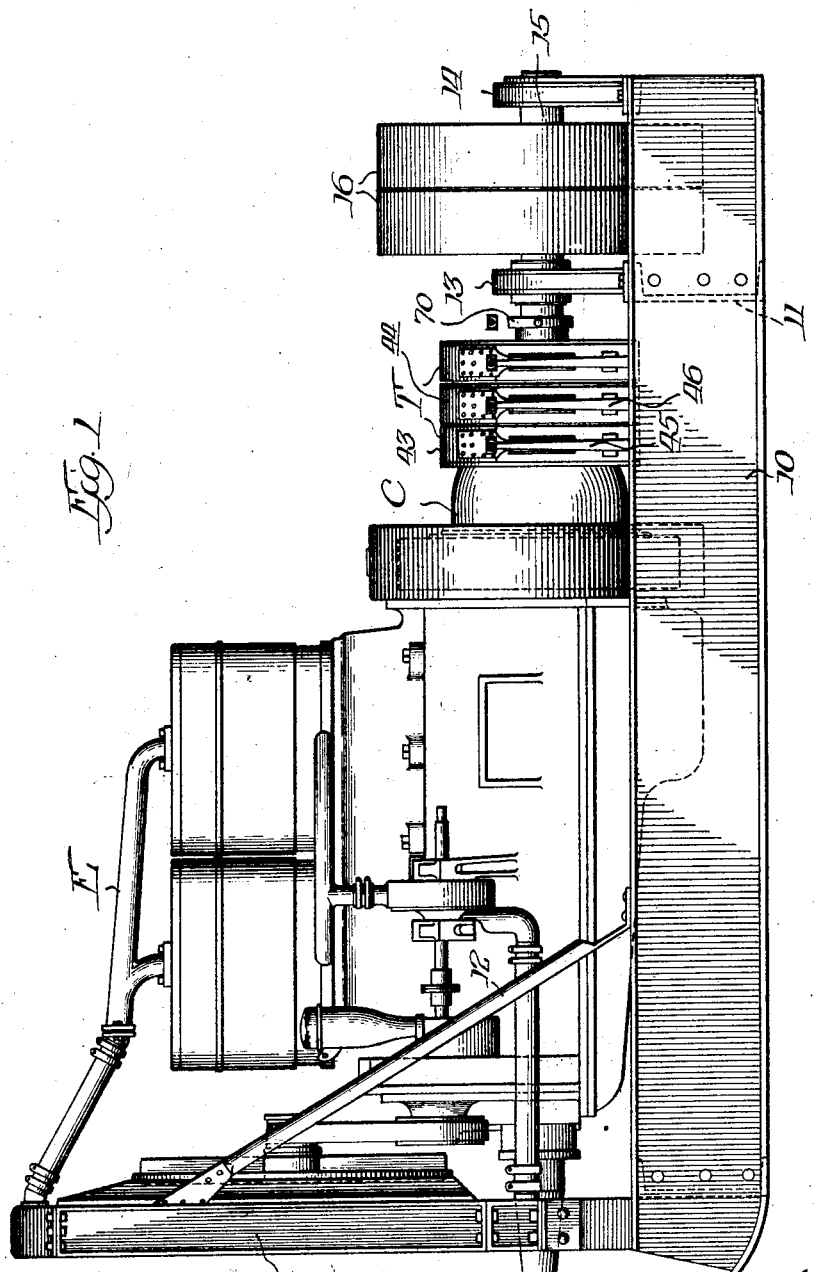

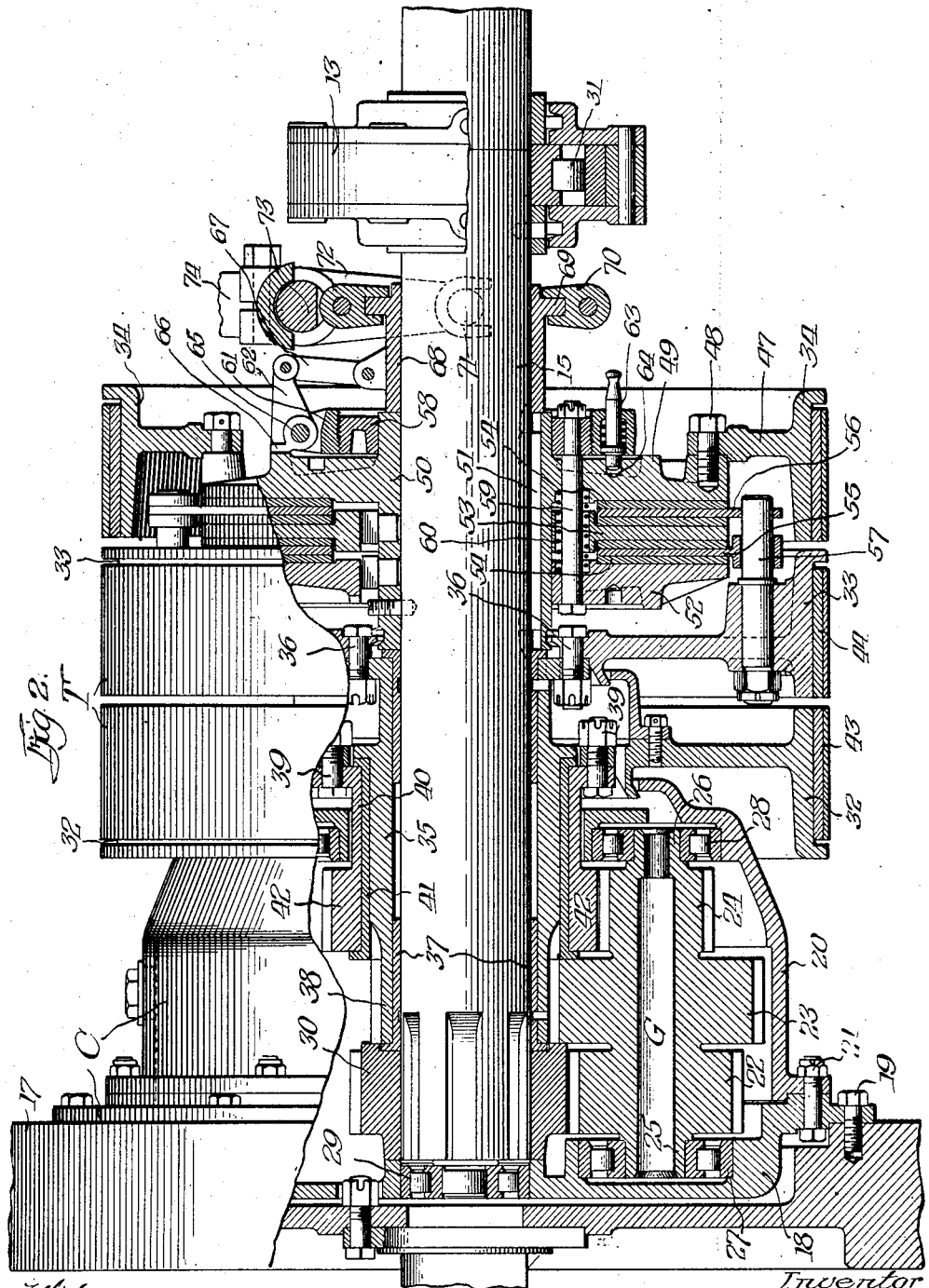

Patented Dec. 13, 1927.

1,652,432

UNITED STATES PATENT OFFICE.

JAMES B. FISHER, OF WAUKESHA, WISCONSIN, ASSIGNOR TO WAUKESHA MOTOR COMPANY, OF WAUKESHA, WISCONSIN, A CORPORATION OF WISCONSIN.

UNITARY POWER STRUCTURE.

Application filed March 10, 1926. Serial No. 93,812.

This invention relates to an improved unitary power structure comprising essentially an internal combustion engine, and a transmission preferably of the planetary gear type controllable for at least two speeds of forward driving and a reverse drive.

In prior driving structures, as for example, the driving outfit in a Ford automotive vehicle, the so-called triple gear sets which revolve with the engine fly wheel, are journalled on pins secured only at one end, but in structures where the driving engine is powerful and the work to be performed is heavy, such support for the triple gear sets would be too weak and flimsy and the pins would soon bend or break off under heavy service. One of the important objects of the invention is therefore to provide stronger and more rigid support for the pins so that the triple gear sets will be at all times maintained in proper alignment and gearing relationship with the other transmission gears and pinions.

Another important object is to provide improved and efficient arrangement for controlling the transmission to directly connect the engine shaft with the drive shaft for direct drive.

Another important object is to produce a compact and strong unitary structure comprising a rigid base on which the engine is securely mounted and on which are bearing structures for journaling and accurately maintaining the alignment on the various shafts under heavy service.

In general, the object of the invention is to produce an efficient unitary structure comprising an internal combustion engine and a planetary transmission controllable for direct speed, low speed and reverse to take care of the variable load and the variable speed required. The improved structure is therefore particularly adaptable in the oil fields for drilling wells where the load changes as the hole becomes deeper and where, as the tools are withdrawn from a hole, the load becomes lighter and it is desirable to change to a faster speed without danger of dropping the load, or where it is desirable to reverse the direction and without danger of dropping the load.

The above features and others are incorporated in the structure disclosed on the drawings, in which, Figure 1 is a side elevational view of the structure;

Fig. 2 is an enlarged vertical diametral sectional view of the fly-wheel end of the engine, and the transmission and controlling mechanism.

The supporting base structure comprises longitudinal beams 10 and cross beam 11. Rigidly mounted at one end of this base structure is the engine structure E, the engine frame being securely bolted to the base structure and the radiator R being further held rigid by means of braces 12.

At the other end of the base structure are mounted the bearing structures 13 and 14 for journaling the transmission shaft 15. Between the bearings the shaft supports the transmission pulley 16, and between the inner bearing 13 and the engine structure is located the transmission T.

In Figure 2, the details of this transmission mechanism are shown. Secured to the fly-wheel 17 of the engine, is the planetary gear casing or housing designated as a whole C. The housing comprises the inner section 18 secured to the fly-wheel by means of screws 19, and the outer section 20 secured to the inner section by means of the bolts 21. The casing is thus readily opened for the insertion of the planetary gear structures designated as a whole G, three such structures being usually provided although on Figure 2 only one is shown, it being understood that these structures are spaced 120° apart. Usually such structures comprise three gears secured on a shaft, but I prefer to have each planetary gear structure in the form of an integral casting comprising the main pinion section 22 and the low speed and reverse pinion sections 23 and 24 respectively. At the ends of each gear structure are the bearing extensions or lugs 25 and 26 which engage in roller bearing structures 27 and 28 supported respectively in the inner and outer casing sections 18 and 20.

The transmission shaft 15 at its inner end journals in a roller bearing structure 29 supported on the inner casing section 18 and splined to the shaft end is the pinion 30 which meshes with the main pinion sections 22 of the planetary gear structures G. The bearing frames 13 and 14 at the outer end of the shaft may have roller bearing structures 31 for the shaft so that this transmission shaft is journaled to rotate with very little friction.

Surrounding the transmission shaft are the reverse drum 32, the low speed drum 33, and the brake drum 34. The low speed drum 33 is secured to the hub 35 by means of bolts 36, the hub surrounding the transmission shaft and bearing bushings 37 being provided therefor. At its inner end the hub has the gear section 38 which meshes with the pinion sections 23 of the planetary gear structures G.

The reverse drum 32 is secured by means of bolts 39 to the bearing hub 40 which surrounds the hub 35 and is provided with a bearing bushing 41. The hub 40 at its inner end has the gear section 42 which meshes with the pinion sections 24 of the planetary gear structures G. Surrounding the drums 32 and 33 are the clutch bands 43 and 44 respectively which by means of toggle mechanism 45 and 46 are adapted to be clamped to the drums to lock said drums against rotation.

The brake drum 34 has the inner web 47 secured by means of screws 48 to the web or flange 49 at the outer end of the hub 50 which is secured to the shaft 15 by the key 51. The flange 49 forms an outer friction or abutment wall, and shiftable longitudinally on the hub 50 is the inner friction or abutment wall 52. Between the friction walls is the intermediate wall 53 and the opposed faces of these walls are lined by friction material 54. Between the outer and inner friction walls and intermediate wall are the friction discs 55 and 56 respectively which are supported by and shiftable on the pins 57 secured to and extending from the low speed drum 33.

Outside of the flange 49 the hub 50 seats a ring 58 to which bolts 59 are secured at their outer ends, these bolts extending through the walls 49 and 52 respectively with their heads abutting against the back of the inner wall 52. Between the walls 49 and 52 compression springs 60 surround the bolts and tend to keep the walls separated and out of friction engagement with the friction discs. Threading on the ring 58 is a band 61 forming a support for clutch levers 62, the band being locked in adjusted position on the ring 58 by means of a latch 63, engaging in latch holes 64 formed in the flange 49.

The levers 62 are of bell crank form and are pivoted at their corners on pins 65, the inner ends 66 of the levers abutting against the flange 49 and the outer ends of the levers being connected by links 67 with the sleeve 68 slidable on the shaft 15. The sleeve at its outer end has the flange 69 received by the collar 70 which has trunnion lugs 71 engaged by a fork structure 72 extending from a shaft 73. Upon rocking of this shaft 73 by suitable lever mechanism 74 the sleeve 68 will be slid on the shaft to bring the toggle links 67 either into vertical or to inclined position. When brought to vertical position, as shown on Figure 2, the lever ends 66 will abut against the flange 49 and the pivot connections 65 will be forced outwardly so that the ring 58 carried with the band 61 will pull on the bolts 59 and consequently the flange or disc 52 will be forced toward the flange 49 and the friction discs and flanges will be frictionally engaged and the low speed drum 33 will be clutched to the brake drum 47 and consequently to the shaft 15. When the sleeve 68 is shifted outwardly and the toggle links 67 inclined, the ring 58 will be released and the springs 60 will separate the friction clutching walls and the low speed drum 33 will be free to rotate relative to the brake drum and shaft.

The operation can now be readily understood. If it is desired to drive the shaft 15 at low speed, the toggle mechanism 46 is actuated to clamp the clutch band 44 to the drum 33 to lock said drum and its gear 38 against rotation. The gear 38 then forms a track for the pinion sections 23 of the planetary gear structures G which revolve with the casing C and the fly-wheel. The rotation imparted to the gear structures will be transmitted by the pinion sections 22 to the shaft pinion 30 and the shaft 15 will be rotated at slow speed.

If reverse drive is desired the low speed drum is released and the reverse drum 32 locked against rotation by its clutch band 43. The gear 42 will then be held stationary to cause rotation of the planetary gear structures through their pinion sections 24 and such rotation will be transmitted through the pinion sections 22 to the shaft pinion 30 and the shaft will be rotated in reverse direction.

If direct drive is desired the low speed and reverse drums are released and the clutch mechanism is actuated to clutch the low speed drum to the brake drum and consequently to the shaft 15. This will lock the low speed drum gear 38 to the shaft and such gear having less teeth than the shaft pinion 30 the planetary gear structures G will be locked against rotation and will act to connect the fly-wheel and the casing C directly to the shaft 15 for direct or high speed drive.

With my improved arrangement a change can be quickly made from one speed to the other without danger of dropping the load. By supporting the planetary gearing structures G within a strong and rigid casing extending from the fly-wheel and by forming adequate bearing surfaces for the outer as well as the inner ends of the gearing structures, such structures will always be held in perfect gearing alignment with the shaft gear and the transmission gears and there can be no distortion or give under the heaviest load. The transmission shaft 15, by being provided with a bearing structure at either side of the load transmitting pulley 16, will be kept accurately in alignment under heavy load. The mounting of the engine structure and transmission mechanism on a strong and rigid base produces a compact unitary outfit which can be readily transported and installed.

Having described my invention, I claim as follows:—

In a unitary power structure, the combination of an internal combustion engine, a plurality of planetary gear sets connected with said engine to be revolved thereby, a transmission shaft, a pinion on said shaft meshing with one of the gear sections of said gear sets, transmission gear structures concentric with said shaft and meshing with other gear sections of said planetary gear sets, means for selectively locking said transmission gear structures against rotation, a brake drum keyed to said shaft, clutch mechanism supported by said brake drum and one of said transmission gear structures, and means for operating said clutch mechanism to clutch said transmission gear structure to said drum whereby said shaft will be driven directly by the engine.

In witness whereof, I hereunto subscribe my name this 6th day of March, 1926.

JAMES B. FISHER.